United States Patent
Hirai

(10) Patent No.: US 10,906,060 B2
(45) Date of Patent: Feb. 2, 2021

(54) COATING DEVICE AND COATING METHOD

(71) Applicant: Envision AESC Energy Devices Ltd., Sagamihara (JP)

(72) Inventor: Masanori Hirai, Kanagawa (JP)

(73) Assignee: Envision AESC Enerev Devices Ltd., Sagamihara (JP)

( * ) Notice: Subject to any disclaimer, the term of this patent is extended or adjusted under 35 U.S.C. 154(b) by 0 days.

(21) Appl. No.: 16/592,928

(22) Filed: Oct. 4, 2019

(65) Prior Publication Data

US 2020/0030840 A1    Jan. 30, 2020

Related U.S. Application Data

(62) Division of application No. 15/756,710, filed as application No. PCT/JP2016/076160 on Sep. 6, 2016, now Pat. No. 10,493,485.

(30) Foreign Application Priority Data

Sep. 18, 2015 (JP) ................................. 2015-185492

(51) Int. Cl.
| | |
|---|---|
| *B05D 1/26* | (2006.01) |
| *B05D 5/00* | (2006.01) |
| *B05C 5/02* | (2006.01) |
| *H01M 4/04* | (2006.01) |

(52) U.S. Cl.
CPC .......... *B05C 5/0258* (2013.01); *B05C 5/0225* (2013.01); *B05C 5/0254* (2013.01); *B05C 5/0245* (2013.01); *B05D 1/26* (2013.01); *B05D 5/00* (2013.01); *B05D 2252/02* (2013.01); *H01M 4/0404* (2013.01)

(58) Field of Classification Search
None
See application file for complete search history.

(56) References Cited

U.S. PATENT DOCUMENTS

| 5,506,046 A | 4/1996 | Andersen et al. |
| 2002/0078890 A1 | 6/2002 | Tsujii et al. |
| 2003/0170379 A1* | 9/2003 | Tsujii ............... C03C 17/001 427/8 |
| 2005/0139319 A1 | 6/2005 | Sugano et al. |
| 2017/0333937 A1* | 11/2017 | Tanley ................. B05C 5/0254 |

FOREIGN PATENT DOCUMENTS

| CN | 1638059 A | 7/2005 |
| JP | 7-171471 A | 7/1995 |
| JP | 2000-070817 A | 3/2000 |
| JP | 2001-00906 A | 1/2001 |
| JP | 2003-001172 A | 1/2003 |
| JP | 2004-033932 A | 2/2004 |
| JP | 2004-230361 A | 8/2004 |
| JP | 2005-262121 A | 9/2005 |
| JP | 2007-245024 A | 9/2007 |
| JP | 2011-143348 A | 7/2011 |
| JP | 2012-061444 A | 3/2012 |
| JP | 2012-61445 A | 3/2012 |
| JP | 2012-086144 A | 5/2012 |
| JP | 2013-052325 A | 3/2013 |
| JP | 2014-180592 A | 9/2014 |
| JP | 2014-229343 A | 12/2014 |
| JP | 2015-097198 A | 5/2015 |

OTHER PUBLICATIONS

Communication dated Aug. 1, 2019 issued by the China National Intellectual Property Administration in counterpart application No. 201680054245.X.

International Search Report of PCT/JP2016/076160 filed Nov. 22, 2016.

Communication dated May 12, 2020, from the Japanese Patent Office in Application No. 2017-539848.

* cited by examiner

*Primary Examiner* — Jose I Hernandez-Kenney

(74) *Attorney, Agent, or Firm* — Sughrue Mion, PLLC

(57) ABSTRACT

A coating device has: a die head that is provided with a supply port into which a coating slurry is supplied, a manifold that stores the coating slurry, and a slit that dispenses the coating slurry; a supply pipe that is connected to the supply port of the die head; and a cover plate that is provided in the supply port or the supply pipe and that reduces the flow rate of the coating slurry at the center of a cross-section that is orthogonal to the direction in which the coating slurry in the supply port or the supply pipe flows into the die head.

1 Claim, 6 Drawing Sheets

From pump

COATING DEVICE AND COATING METHOD

CROSS REFERENCE TO RELATED APPLICATIONS

This application is a divisional of U.S. patent application Ser. No. 15/756,710, filed Mar. 1, 2018, which is a National Stage of International No. PCT/JP2016/076160 filed Sep. 6, 2016 claims priority to Japanese Patent Application No. 2015-185492, filed Sep. 18, 2015.

TECHNICAL FIELD

The present invention relates to a coating device and a coating method for forming a coating active material layer on a current collector.

BACKGROUND ART

A laminated type cell is known as an example of a secondary battery. A laminated type cell has a construction in which positive-electrode sheets and negative-electrode sheets that are alternately and repeatedly stacked on each other with separators interposed therebetween. Each of the positive-electrode sheets and the negative-electrode sheets is configured an active material layer coated uniformly on a current collector. An example of a coating device for fabricating electrode sheets is disclosed in Patent Document 1.

An example of a relevant coating device and coating method are next described.

FIG. 8 and FIG. 9 are drawings showing an example of the configuration of a related coating device. FIG. 8 is a side view of the related coating device, and FIG. 9 is a top view of the principal parts of the device. In FIG. 8, moreover, a portion is shown in a transparent view for the purpose of explanation.

As shown in FIG. 8, the coating device includes: roller 210 which rotates in synchronization with the take-up speed of current collector 200 and through which current collector 200 is transported when current collector 200 that has been set in a pay-out portion (not shown in the figures) is being taken up toward a take-up portion (not shown in the figures); and die head 230 that dispenses coating slurry 220 that contains an active material upon current collector 200. Die head 230 has manifold 231 that stores coating slurry 220 that is supplied and slit 232 that dispenses coating slurry 220 that is stored in manifold 231 to current collector 200. Coating slurry 220 is supplied from a pump (not shown in the figures) to die head 230 by way of gate valve 250 and supply pipe 240.

Coating slurry 220 that is stored in manifold 231 is extruded to current collector 200 through slit 232 under the pressure of coating slurry 220 that is supplied from the pump (not shown). Coating active material layer 222 realized by coating slurry 220 is uniformly formed on current collector 200 by the take-up of current collector 200 toward the take-up portion (not shown) together with the rotation of roller 210.

As shown in FIG. 9, coating slurry 220 that flows into manifold 231 by way of supply pipe 240 is dispensed onto current collector 200 by way of slit 232 and coating active material layer 222 is formed on current collector 200. In the following explanation, the direction in which coating slurry 220 is dispensed from slit 232 is referred to as the coating direction. In addition, the direction perpendicular to the coating direction is referred to as the width direction of current collector 200, manifold 231, slit 232, and coating active material layer 222. In FIG. 9, the coating direction and width direction are indicated by arrows.

When an aqueous slurry is used as the coating slurry in the process of coating a negative-electrode, the problem arises that there are local sites, in which the coating weight of active material per unit area increases, in the width direction of the current collector.

FIG. 10 is a graph showing the coating weight of active material per unit area in the related coating method. The coating weight of active material per unit area was measured at 19 measurement points in the width direction of the current collector and the average value is taken as 100%. The horizontal axis of the graph shown in FIG. 10 shows the positions of the measurement points of the coating active material layer. The vertical axis of the graph shows in percentage the shift between the average value and the measured value at each measurement point.

Referring to FIG. 10, there clearly are sites at which the coating weight of active material per unit area is markedly greater than the average value, and further, sites at which the coating weight of active material per unit area is markedly smaller than the average value. The difference between the maximum value and minimum value of the coating weight of active material per unit area is approximately 3% of the average value of the coating weight of active material per unit area. The variation (standard deviation) is 0.70%.

An example of a method of making the thickness of the coating active material layer uniform is disclosed in Patent Document 2.

In the method disclosed in Patent Document 2, a flow adjustment plate is provided in a pocket that corresponds to the manifold of the die head. The flow adjustment plate is provided with a plurality of through-holes having differing aperture areas. The aperture area of through-holes is at a minimum in the vicinity of the coating material supply port of the pocket and the aperture area of through-holes gradually increases with increasing distance from the coating material supply port.

PRIOR ART DOCUMENTS

Patent Documents

Patent Document 1: Japanese Patent Application Laid-open No. 2012-61444
Patent Document 2: Japanese Patent Application Laid-open No. 2000-708017

SUMMARY OF THE INVENTION

Problem to be Solved by the Invention

In the method disclosed in Patent Document 2, the flow adjustment plate must be produced to fit the shape of the pocket of the die head, and the flow adjustment plate must be inserted into the pocket with no gaps.

The present invention was realized to solve the problems inherent in the above-described technology and an object of the present invention is to provide a coating device and coating method that more readily enable an improvement in the uniformity of the thickness of a coating active material layer.

Means for Solving the Problem

The coating device of the present invention for achieving the above-described object is of a configuration that includes:

a die head that is provided with a supply port into which coating slurry is supplied, a manifold that stores the coating slurry, and a slit that dispenses the coating slurry;

a supply pipe that is connected to the supply port of the die head; and a cover plate that is provided in the supply port or the supply pipe and that reduces the flow rate of the coating slurry in the center of the cross-section that is orthogonal to the direction in which the coating slurry flows into the die head, in the supply port or the supply pipe.

In addition, the coating method of the present invention is a coating method that uses a coating device that is provided with at least a die head provided with a supply port into which coating slurry is supplied, a manifold that stores the coating slurry, and a slit that dispenses coating slurry that is stored in the manifold and a supply pipe having one end connected to the supply port and the other end connected to a gate valve that switches between supplying and cutting off coating slurry; the method including steps of reducing the flow rate of the coating slurry in at least the central portion of a cross-section that is orthogonal to the direction of advance of coating slurry in the supply pipe and supplying the coating slurry to the supply port.

Effect of the Invention

According to the present invention, thickness uniformity of a coating active material layer can be easily improved.

EXEMPLARY EMBODIMENT OF THE INVENTION

Figure 10:
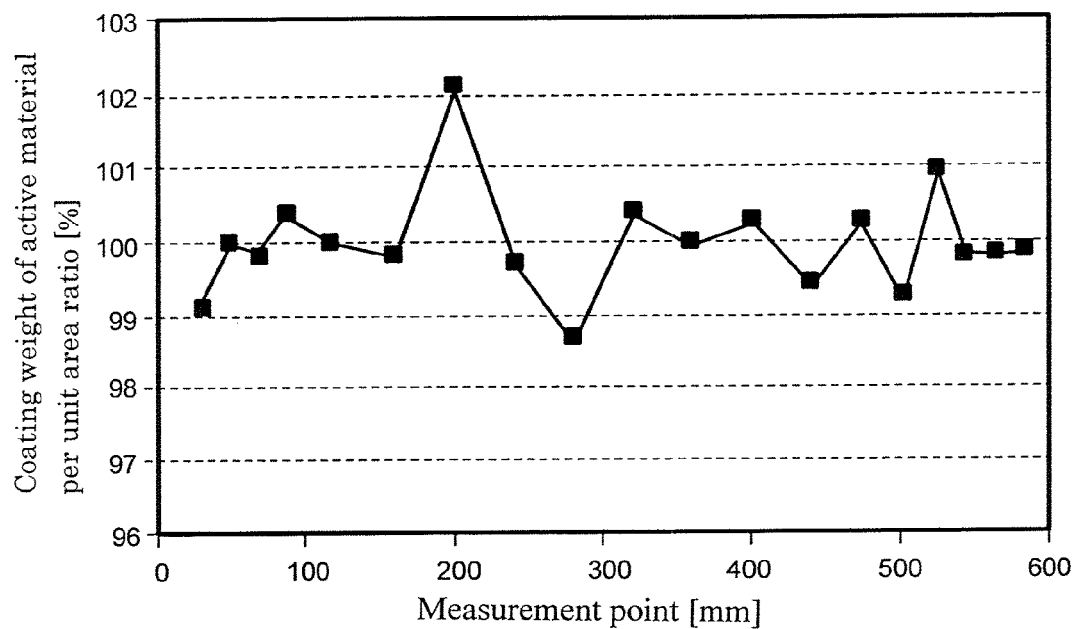
FIG. 10 is a graph showing the measurement results regarding the coating weight of active material per unit area realized by a related coating method.

When an NMP (N-methyl-2-pyrrolidone) slurry is used as the coating slurry to overcome the above-described problem, the occurrence of localized increases in the coating weight of active material per unit area as shown in FIG. 10 virtually ceases. The inventors focused attention on the flow rate of the slurry in the supply pipe. If the slurry is assumed to be a laminar flow, the flow of slurry within a round pipe becomes a Hagen-Poiseuille flow.

Figure 1:
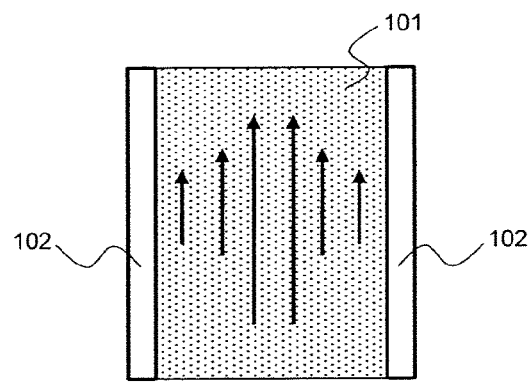
FIG. 1 is an image showing the differences of the flow rate of coating slurry in a supply pipe.

FIG. 1 is an image showing the differences in flow rate of slurry in a supply pipe. FIG. 1 is a cross-section view in which supply pipe 102 is cut parallel to the direction of flow of the slurry. The lengths of the arrows shown in FIG. 1 represent the magnitudes of the flow rate of slurry 101. As shown in FIG. 1, the flow rate of slurry 101 is greater in the vicinity of the center in supply pipe 102 and decreases with proximity to the wall surfaces.

Because the surface tension of water is approximately 1.8 times the surface tension of NMP, an aqueous slurry tends to result in more differences in flow rate than an NMP slurry.

The inventors believe that turbulent flow occurs in the manifold when an aqueous slurry is supplied to the die head while flow rate differences are maintained without change in the supply pipe, and that localized increases in the coating weight of active material per unit area of the coating active material layer occur as a result. The inventors arrived at the concept of the coating device and coating method by inferring the cause of the occurrence of this problem.

Exemplary embodiments of the coating device and coating method of the present invention are next described.

The configuration of the coating device of the present exemplary embodiment is first described.

Figure 2:
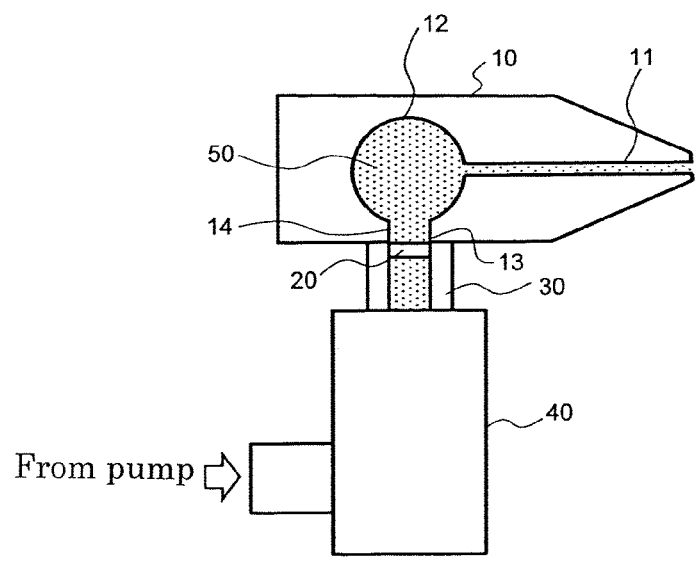
FIG. 2 shows the principal parts of the configuration of the coating device of the present exemplary embodiment.

FIG. 2 shows the principal parts of the configuration of the coating device of the present exemplary embodiment.

The coating device has: die head 10 that dispenses coating slurry 50 that is supplied from the outside, onto a current collector (not shown), and cover plate 20 that reduces the differences in flow rate of coating slurry 50 in supply port 13 of coating slurry 50 to die head 10.

Die head 10 is provided with supply port 13 of coating slurry 50, manifold 12 that stores coating slurry 50, and slit 11 that dispenses coating slurry 50. Aperture 14 for supplying coating slurry 50 from supply port 13 to manifold 12 is formed in die head 10. Coating slurry 50 that is supplied to die head 10 passes through supply port 13 and is stored inside manifold 12, and this stored coating slurry 50 is then dispensed by way of slit 11 to a current collector (not shown).

In FIG. 2, cover plate 20 that is provided in supply pipe 30 is shown to be bonded to die head 10, but cover plate 20 may be arranged in supply pipe 30 between supply port 13 of coating slurry 50 of die head 10 and gate valve 40. Gate valve 40 switches between supplying and cutting off coating slurry 50. By positioning cover plate 20 in the vicinity of the die head, coating slurry 50 that passes by way of cover plate 20 is supplied to die head 10 in a stable state and good coating conditions are realized despite changes in the flow rate caused by pulsation of the pump (not shown) for supplying coating slurry 50 or by opening and closing of gate valve 40.

In addition, supply pipe 30 further includes a junction part (not shown), and cover plate 20 is preferably incorporated in this junction part such that regardless of the shape of cover plates 20, they can be interchanged depending on coating slurry 50. The junction part is, for example, a joint that connects two supply pipes. If the junction part is of a type in which two flange joints are secured by a clamp, the worker, after unfastening the clamps and exchanging cover plates 20 between the two flange joints, only needs to engage the clamp and secure the two flange joints. In this case, the work required to exchange cover plates 20 is made easier.

By providing cover plate 20 immediately before die head 10 as described hereinabove, when coating slurry 50 flows into manifold 12, stable coating can be realized without any turbulence occurring inside manifold 12. In particular, the effect of a superior stabilized coating is obtained in the case of a construction in which coating slurry 50 from supply port 13 flows into manifold 12 by way of aperture 14 that is disposed at least in the vicinity of the center in the width direction of manifold 12.

Explanation is next presented below regarding a case in which cover plate 20 is provided in supply pipe 30 that is connected to supply port 13 of die head 10 as shown in FIG. 2, but cover plate 20 may also be provided inside aperture 14 between manifold 12 and supply pipe 30. In addition, supply pipe 30 is a round pipe in the present exemplary embodiment.

The configuration of cover plate 20 shown in FIG. 2 is next described.

Figure 3:
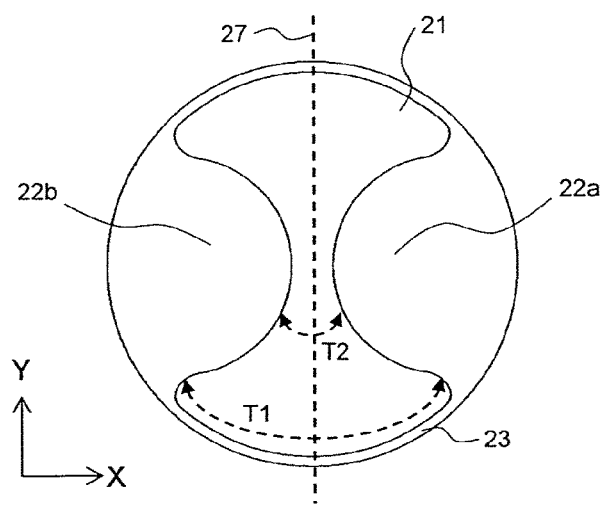
FIG. 3 is a top view showing an example of the configuration of the cover plate shown in FIG. 2.

FIG. 3 is a top view showing an example of the configuration of the cover plate. Here, in the interest of simplifying the explanation, the X-axis and Y-axis are defined as shown in FIG. 3.

As shown in FIG. 3, the cover plate has frame-shaped edge portion 23 along the walls of supply pipe 30 shown in FIG. 2 and convex-shaped restraining plates 22a and 22b that extend in the direction toward the center of the cross-section of supply pipe 30. Because supply pipe 30 is a round pipe in the present exemplary embodiment, edge portion 23 is a ring shape. Edge portion 23 and restraining plates 22a and 22b are formed monolithically.

Restraining plates 22a and 22b are arranged in linear symmetry with respect to central axis 27 that passes through the center of the cover plate. In the cross-section of supply pipe 30, opening 21 is formed in areas other than edge portion 23 and restraining plates 22a and 22b. The shape of opening 21 also has linear symmetry with respect to central axis 27.

Opening 21 is of a configuration in which the length along the walls of supply pipe 30 and edge portion 23 (for example, arrows T1 and T2 of both directions shown in FIG. 3) continuously decreases in size from the periphery to the center of the cross-section of supply pipe 30. Arrow T1 indicates an example of the length of the side close to edge portion 23 and arrow T2 indicates an example of the length of the side close to the center of the cover plate.

Focusing on the area of opening 21, opening 21 is shaped such that two fan-shaped openings are connected by way of a narrowed open portion parallel to central axis 27.

In the configuration shown in FIG. 3, the area of opening 21 in the vicinity of the center in the cross-section of supply pipe 30 to die head 10 is small while the area of opening 21 in the vicinity of the periphery is large. As a result, the flow rate of coating slurry is reduced in the vicinity of the center, and the flow rate of coating slurry in the vicinity of the center is equivalent to the flow rate of the coating slurry of the periphery.

Figure 4:
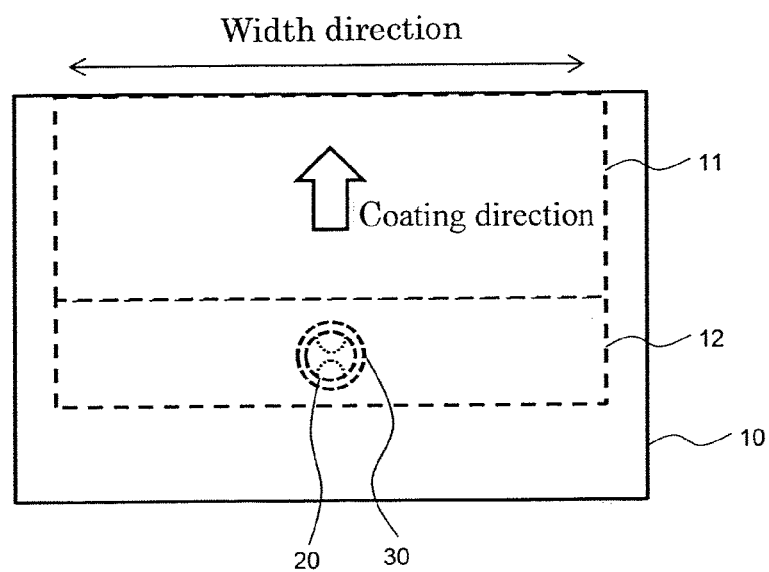
FIG. 4 is a transparent view when the die head shown in FIG. 2 is viewed from above.

FIG. 4 is a transparent view when the die head shown in FIG. 2 is viewed from above.

FIG. 4 is for a case in which opening 14 shown in FIG. 2 is arranged close to the center with respect to the width direction of manifold 12. As shown in FIG. 4, cover plate 20 is arranged inside supply pipe 30 such that central axis 27 shown in FIG. 3 is parallel to the width direction of manifold 12 and slit 11.

Regarding the method of arranging cover plate 20 with respect to die head 12 in the following explanation, an arrangement such as shown in FIG. 4 is referred to as "horizontal placement" and an arrangement in which cover plate 20 shown in FIG. 4 is rotated 90 degrees is referred to as "vertical placement." In other words, in the case of vertical placement, central axis 27 of cover plate 20 is perpendicular to the width direction shown in FIG. 4.

Examples of modifications of the cover plate shown in FIG. 3 are next described.

(Modification 1)

Figure 5A:
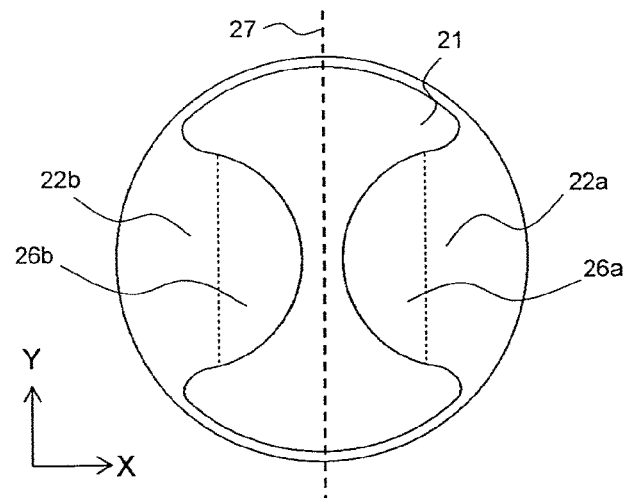
FIG. 5A is a top view showing the configuration of Modification 1 of the cover plate shown in FIG. 2.
Figure 5B:
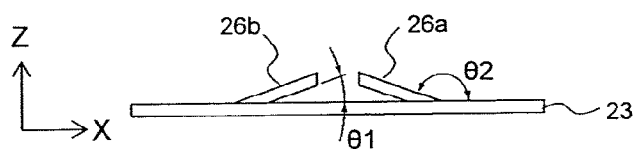
FIG. 5B is a side view of the cover plate of Modification 1 shown in FIG. 5A.

FIGS. 5A and 5B are a top view and side view of Modification 1 of the cover plate. In the interest of convenience of explanation, the X-axis, Y-axis, and Z-axis are defined as shown in the figure.

In the cover plate of Modification 1, compared to the cover plate 20 shown in FIG. 3, restraining plates 22a and 22b have tilted portions 26a and 26b that are tilted toward the die-head 10 side from the cross-section of supply pipe 30 shown in FIG. 2.

As shown in FIG. 5B, tilted portions 26a and 26b are tilted in the direction of the Z-axis (in the inflow direction of coating slurry 50). Angle θ1 indicated in FIG. 5B is 20°, and angle θ2 is 160°. Angles θ1 and θ2 are merely examples.

In the configuration of Modification 1, although restraining plates 22a and 22b reduce the flow rate of coating slurry 50 in the vicinity of the center of the cross-section of supply pipe 30, tilted portions 26a and 26b have the effect of easing a reduction in the flow rate. As a result, the effect can be expected that differences in the flow rate of coating slurry 50 in the cross-section of supply pipe 30 will gradually decrease from the center to the periphery.

The results of appraisal of the coating active material layer realized by the coating device of the present exemplary embodiment are next described.

The results of comparing the measurement results shown in FIG. 10 and the next cases (1) and (2) are next described. Because the method of appraising the coating active material layer is the same as the method described with reference to FIG. 10, detailed explanation is omitted. Case (1) is a case of using the cover plate described in FIG. 3 (vertical placement and horizontal placement), and case (2) is a case in which the cover plate of Modification 1 is placed horizontally.

(1) When Using the Cover Plate Shown in FIG. 3:

When the cover plate shown in FIG. 3 was set in horizontal and vertical placement, the variation was 0.43-0.59%, and the difference between the maximum value and minimum value of the coating weight of active material per unit area was 1.6-1.9%. In the measurement results shown in FIG. 10, the variation was 0.70% and the difference between the maximum value and minimum value of the coating weight of active material per unit area was 3% or more. It can thus be seen that, for the cover plate shown in FIG. 3, the variation is lower than in the measurement results shown in FIG. 10, and the difference between the maximum value and the minimum value of the coating weight of active material per unit area is also lower.

Figure 6:
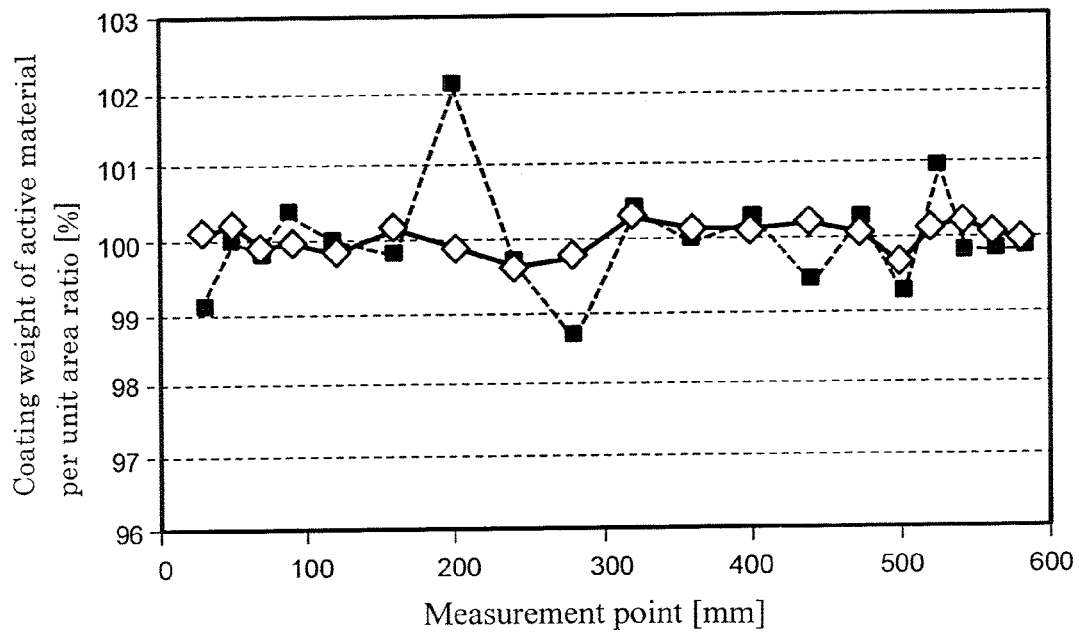
FIG. 6 is a graph showing the measurement results of the coating weight of active material per unit area when using the cover plate of Modification 1.

(2) When the Cover Plate of Modification 1 is Set to Horizontal Placement:

FIG. 6 is a graph showing the measurement results when the cover plate of Modification 1 is set in horizontal placement. The square blank points and the solid line that joins these points are the measured points when the cover plate of Modification 1 is set in horizontal placement. For the sake of comparison, FIG. 6 shows the graph shown in FIG. 10 overlaying the graph that shows the measurement results of Modification 1. The black square points and the broken line that joins these points correspond to the graph shown in FIG. 10.

Focusing on the variation, the variation is reduced to 0.12% in Modification 1, in contrast to 0.70% in the graph shown in FIG. 10. Focusing on the difference between the maximum value and minimum value of the coating weight of active material per unit area, the difference is reduced to 0.5% in Modification 1, in contrast to 3% or more in the graph shown in FIG. 10.

In the case of horizontal placement of the cover plate shown in FIGS. 5A and 5B, central axis 27 shown in FIG. 5A is parallel to the width direction of die head 10, and as a result, the two fan-shaped openings shown in FIG. 5A are arranged parallel to the width direction of die head 10 on opposite sides of a narrowly constricted opening. It is therefore believed that the coating slurry in the vicinity of the periphery that has a slower flow rate than in the vicinity of the center in the supply pipe tends to disperse smoothly in the width direction of each of manifold 12 and slit 11. This effect is also similar for the cover plate shown in FIG. 3.

It is further believed that tilted portions 26a and 26b result in the action of easing the force exerted by restraining plates 22a and 22b to reduce the flow rate of coating slurry 50 in the vicinity of the center of the cross-section of supply pipe 30.

Figure 7A:
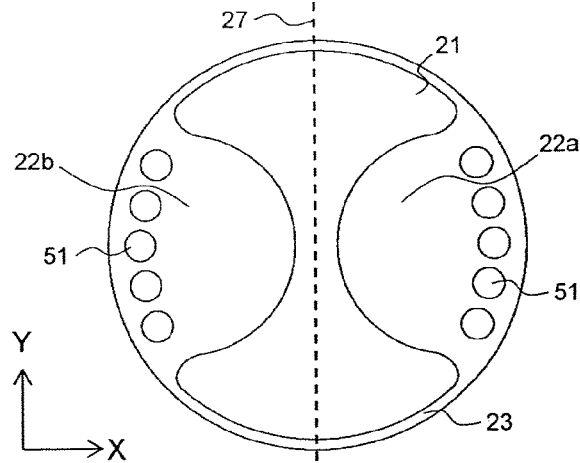
FIG. 7A is a top view showing the configuration of Modification 2 of the cover plate shown in FIG. 2.
Figure 7B:
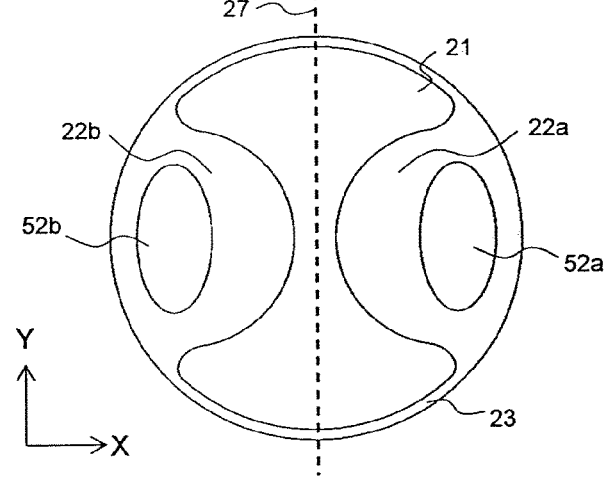
FIG. 7B is a top view showing the configuration of Modification 3 of the cover plate shown in FIG. 2.
Figure 7C:
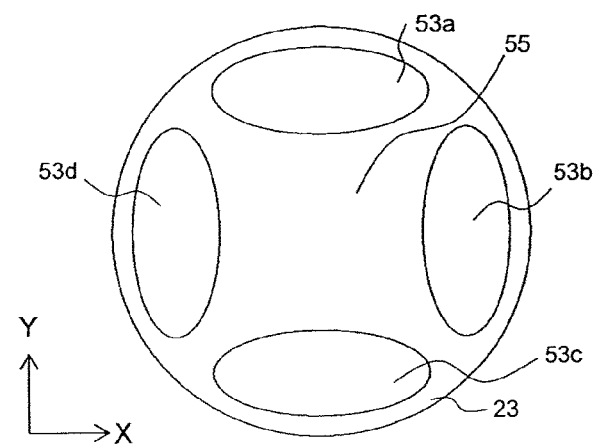
FIG. 7C is a top view showing the configuration of Modification 4 of the cover plate shown in FIG. 2.
Figure 8:
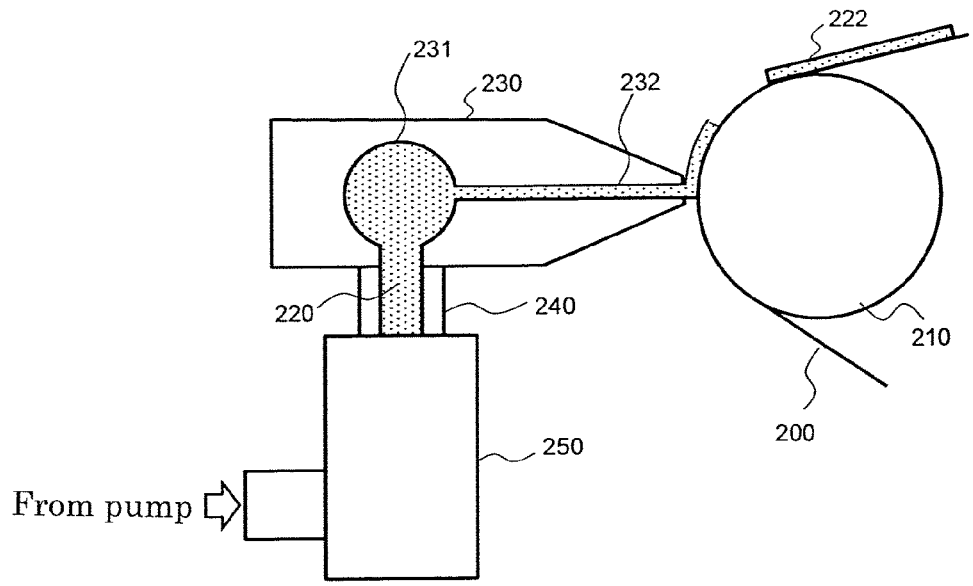
FIG. 8 shows an example of the configuration of a related coating device.
Figure 9:
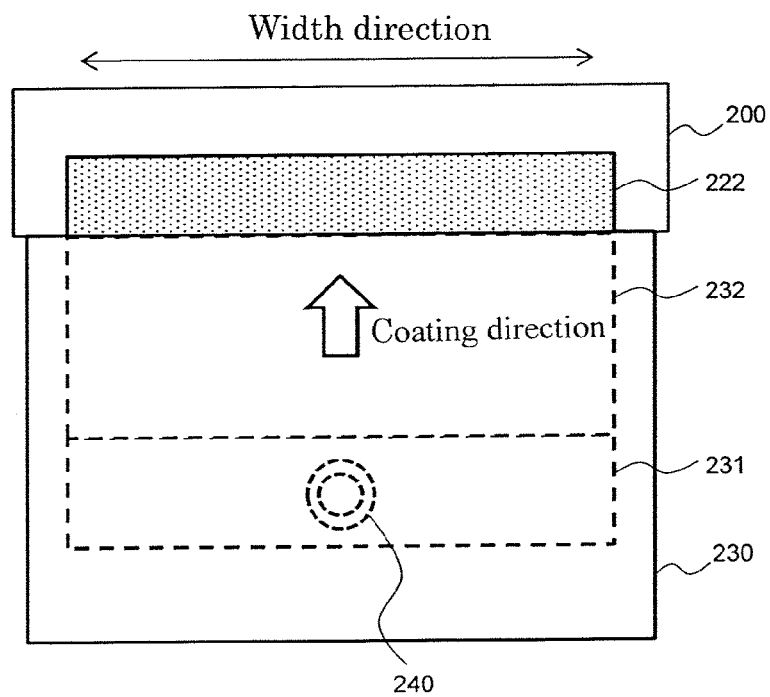
FIG. 9 shows the die head shown in FIG. 8 when viewed from above.

Modifications of cover plate 20 are next described. FIGS. 7A to 7C are top views showing the configurations of Modifications 2-4 of the cover plate. For the sake of expediency of explanation, the X-axis and Y-axis are defined similarly to FIG. 3.

(Modification 2)

The cover plate shown in FIG. 7A is of a configuration in which, compared to the cover plate shown in FIG. 3, a plurality of openings 51 are formed in each of restraining plates 22a and 22b. In the configuration shown in FIG. 7A, five openings 51 are formed in each of restraining plate 22a and restraining plate 22b. Focusing on the side of restraining plate 22a, five openings 51 are arranged along the outer periphery of the cover plate at the joining portion of restraining plate 22a which join with edge 23. The five openings 51 formed in restraining plate 22a and five openings 51 formed on restraining plate 22b are arranged in linear symmetry with respect to central axis 27.

In the configuration of Modification 2, a plurality of openings 51 are provided at the joining portions of restraining plates 22a and 22b which join with edge portions 23.

As a result, reduction in the flow rate of coating slurry 50 at the periphery of the cross-section of supply pipe 30 shown in FIG. 2 can be eased.

In the present modification, restraining plates 22a and 22b may also have tilted portions 26a and 26b as shown in FIGS. 5A and 5B.

(Modification 3)

The cover plates shown in FIG. 7B is of a configuration in which, compared to the cover plates shown in FIG. 7A, openings 52a and 52b that have an opening area greater than that of openings 51 are formed in restraining plates 22a and 22b, respectively. Opening 52a and opening 52b are arranged in linear symmetry with respect to central axis 27.

In the configuration of Modification 3, openings 52a and 52b that extend in a direction from edge portion 23 toward the center are provided in restraining plates 22a and 22b. As a result, the effects can be expected include not only easing a reduction in the flow rate of coating slurry 50 at the periphery in the cross-section of supply pipe 30 shown in FIG. 2, but also reducing the difference in the flow rate of coating slurry 50 from the center to the periphery in the cross-section of supply pipe 30.

In this modification as well, restraining plates 22a and 22b may also have tilted portions 26a and 26b, as shown in FIGS. 5A and 5B.

In the cases of the cover plates of Modification 2 and Modification 3, it is believed that, even when the cover plate is set to vertical placement, the effect obtained can approach that of the case of setting the cover plate in the horizontal placement.

(Modification 4)

The cover plate shown in FIG. 7C includes: frame-shaped edge portion 23 along the walls of supply pipe 30 shown in FIG. 2, restraining plate 55 that reduces the flow rate of coating slurry 50 in the center of the cross-section of supply pipe 30, and openings 53a-53d formed along edge portion 23 at the periphery of restraining plate 55. Opening 53a and opening 53c are arranged in linear symmetry with respect to the axis that passes through the center of the cover plate and that is parallel to the X-axis. In addition, opening 53b and opening 53d are arranged in linear symmetry with respect to the axis that passes through the center of the cover plate and that is parallel to the Y-axis.

In the configuration of Modification 4, opening 53a and opening 53c are arranged in linear symmetry with respect to the axis that passes through the center of the cover plate, and opening 53b and opening 53d are arranged in linear symmetry with respect to another axis that is orthogonal to the aforementioned axis. The effect is therefore obtained that regardless of whether the cover plate is set to vertical or horizontal placement, the flow rate of the coating slurry in the cross-section of the supply pipe is equalized. Although a case is shown in FIG. 7C in which there are four openings 53a-53d, the number of openings is not limited to four.

In the coating device of the present exemplary embodiment, a cover plate that is provided in the supply port or supply pipe of the coating slurry to the die head has a construction by which the force that reduces the flow rate in the center is greater than the force that reduces the flow rate at the periphery in the cross-section of the supply port or the supply pipe. As a result, the flow rate of the coating slurry is reduced in the center of the cross-section of the supply port or the supply pipe, and the coating slurry is uniformly dispensed with respect to the width direction of the slit, from the slit by way of the manifold. As a result, the thickness of the coating active material layer that is applied to a current collector is uniform with respect to the width direction of the current collector, and the uniformity of the coating weight of active material per unit area of the coating active material layer is improved.

In addition, in the method disclosed in Patent Document 1, the die head must be disassembled and then a flow amount adjustment plate is installed, but in the present exemplary embodiment, the cover plate of the present exemplary embodiment need only be installed in the supply port or supply pipe for supplying coating slurry to the die head. As a result, the uniformity of the coating layer thickness can be improved by a method that is more convenient than the method disclosed in Patent Document 1.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-185492, filed on Sep. 18, 2015, the disclosure of which is incorporated herein in its entirety by reference.

EXPLANATION OF REFERENCE NUMBERS 10 die head
11 slit
12 manifold
13 supply port
20 cover plate
30 supply pipe
50 coating slurry

What is claimed is:

1. A coating method that uses a coating device comprising at least:
   a die head including a supply port into which a coating slurry is supplied,
   a manifold that stores the coating slurry, a slit that dispenses the coating slurry that is stored in the manifold, and
   a supply pipe having one end connected to the supply port and another end connected to a gate valve that switches between supplying and cutting off the coating slurry, said method comprising:
   reducing, more in a center than at a periphery of a cross-section of the supply pipe that is orthogonal to a direction in which the coating slurry flows in the supply pipe, a flow rate of the coating slurry through the cross-section of the supply pipe;
   maintaining a flow rate of the coating slurry in a vicinity of a wall surface of the supply pipe; and
   supplying the coating slurry to the supply port.

* * * * *